(12) United States Patent
Moon et al.

(10) Patent No.: US 12,039,701 B2
(45) Date of Patent: Jul. 16, 2024

(54) APPARATUS FOR ENHANCING IMAGE QUALITY AND METHOD FOR THE SAME

(71) Applicant: SAMSUNG ELECTRONICS CO., LTD., Suwon-si (KR)

(72) Inventors: Bochang Moon, Gwangju (KR); Jonghee Back, Gwangju (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 541 days.

(21) Appl. No.: 17/326,277

(22) Filed: May 20, 2021

(65) Prior Publication Data
US 2022/0156902 A1    May 19, 2022

(30) Foreign Application Priority Data
Nov. 19, 2020 (KR) .................. 10-2020-0155339

(51) Int. Cl.
*G06T 5/50* (2006.01)
*G06N 3/08* (2023.01)

(52) U.S. Cl.
CPC ............... *G06T 5/50* (2013.01); *G06N 3/08* (2013.01); *G06T 2207/20081* (2013.01); *G06T 2207/20084* (2013.01); *G06T 2207/20212* (2013.01)

(58) Field of Classification Search
CPC ........... G06T 5/50; G06T 2207/20081; G06T 2207/20084; G06T 2207/20212; G06T 2207/20221; G06T 5/002; G06T 15/06; G06N 3/08
See application file for complete search history.

(56) References Cited

U.S. PATENT DOCUMENTS

| 11,216,916 | B1* | 1/2022 | Kozlowski | G06T 5/50 |
| 2012/0002896 | A1* | 1/2012 | Lertrattanapanich | G06T 5/002 382/260 |
| 2017/0287190 | A1* | 10/2017 | Lin | G06T 5/20 |
| 2018/0115705 | A1* | 4/2018 | Olsson | G06T 5/009 |
| 2020/0090305 | A1* | 3/2020 | El-Khamy | G06N 3/08 |
| 2020/0217719 | A1* | 7/2020 | Parrish | G01J 5/061 |
| 2022/0044364 | A1* | 2/2022 | Jee | G05D 1/0253 |

FOREIGN PATENT DOCUMENTS

| JP | 2006004051 A | 1/2006 |
| KR | 101893557 B1 | 8/2018 |
| KR | 20200119921 A | 3/2019 |

OTHER PUBLICATIONS

Bitterli et al. "Nonlinearly Weighted First-order Regression for Denoising Monte Carlo Renderings", Computer Graphics Forum 35, 4 107-117 (2016).
Sadeghi et al. "Coherent path tracing", Journal of Graphics, GPU, and Game Tools 14, 2 33-43 (2009).

(Continued)

*Primary Examiner* — Xuemei G Chen
(74) *Attorney, Agent, or Firm* — NSIP Law

(57) ABSTRACT

An apparatus for enhancing image quality includes a combining module configured to combine an independent image having pixels independent from each other and a correlated image including correlation information between pixels and an artificial intelligence (AI) apparatus configured to provide a weight used to combine the independent image and the correlated image.

18 Claims, 3 Drawing Sheets

(56) References Cited

OTHER PUBLICATIONS

Hachisuka et al., "Progressive Photon Mapping", ACM Trans. Graph. 27, 5, Article 130, 8 pages (2008).
Kalantari et al., "A Machine Learning Approach for Filtering Monte Carlo Noise", ACM Trans. Graph. 34, 4, Article 29-5 2020-11-19 122, 12 pages (2015).
Bako et al. "Kernel-Predicting Convolutional Networks for Denoising Monte Carlo Renderings", ACM Trans. Graph. 36, 4, Article 97, 14 pages ((2017).

* cited by examiner

APPARATUS FOR ENHANCING IMAGE QUALITY AND METHOD FOR THE SAME

CROSS-REFERENCE TO RELATED APPLICATIONS

This application claims the benefit under 35 U.S.C. § 119(a) to Korean Patent Application No. 10-2020-0155339, filed on Nov. 19, 2020, in the Korean Intellectual Property Office, the entire disclosure of which is incorporated herein by reference for all purposes.

BACKGROUND OF THE INVENTION

1. Field of the Invention

The present disclosure relates to an apparatus and method for enhancing image quality. The present disclosure relates to an apparatus and method for enhancing the quality of a rendered image upon rendering an image.

2. Description of the Related Art

As a method of generating an image through realistic rendering, a Monte Carlo path tracing method is widely known. Since the Monte Carlo path tracing method uses a statistical method, noise is included in a rendered image. In addition, many samples are required to obtain good quality, which takes a long time. In an image provided by this method, there is no correlation between a pixel and another pixel. To this end, the image provided by this method may be referred to as an independent image.

A method of reducing noise of the independent image has been studied over a long period of time. For example, there is a method of reducing noise on the assumption that there is no correlation between pixels. According to this method, when an image with correlation between pixels is used as input, errors in the image may not be efficiently removed. Meanwhile, the image provided by this method may be referred to as a correlated image because there is correlation between a pixel and another pixel.

The method of providing the correlated image is disclosed in a postprocessing noise removal technique (Non-patent documents 1, 4 and 5), a correlated sampling technique (Non-patent document 2) and a light transport simulation method having correlation (Non-patent document 3).

The correlated image can reduce noise occurring in the independent image but cannot prevent specific residual noise and system error from occurring in the corresponding method.

(Non-patent document 1) Document 1: Bitterli et al., "Nonlinearly Weighted First-order Regression for Denoising Monte Carlo Renderings", Computer Graphics Forum 35, 4 (2016), 107-117.

(Non-patent document 2) Document 2: Sadeghi et al., "Coherent path tracing", Journal of Graphics, GPU, and Game Tools 14, 2 (2009), 33-43.

(Non-patent document 3) Document 3: Hachisuka et al., "Progressive Photon Mapping", ACM Trans. Graph. 27, 5, Article 130 (2008), 8 pages.

(Non-patent document 4) Document 4: Kalantari et al., "A Machine Learning Approach for Filtering Monte Carlo Noise", ACM Trans. Graph. 34, 4, Article 122 (2015), 12 pages.

(Non-patent document 5) Document 5: Bako et al., "Kernel-Predicting Convolutional Networks for Denoising Monte Carlo Renderings", ACM Trans. Graph. 36, 4, Article 97 (2017), 14 pages.

SUMMARY OF THE INVENTION

The present disclosure proposes an apparatus and method for enhancing image quality, which can reduce noise of an independent image and errors of a correlated image.

An apparatus for enhancing image quality according to the present disclosure may include a combining module configured to combine an independent image having pixels independent from each other and a correlated image including correlation information between pixels and an artificial intelligence (AI) apparatus configured to provide a weight used to combine the independent image and the correlated image.

The independent image and the correlated image may be combined in pixel units.

The weight may be different for each pixel.

The AI apparatus may train the independent image, the correlated image and the feature together in order to provide the weight.

At least one independent image and at least one correlated image may be included. By providing more images, image quality may be further enhanced. When there are more correlated images, the effect of removing an outlier may be further increased.

The feature may include at least one of normal information, texture information or depth information.

The weight may include a first weight for a pixel prediction value of a target pixel c in the independent image and a second weight for a sum of an independent pixel prediction value of a certain adjacent pixel i adjacent to the target pixel c and a difference $z_c - z_i$ between correlated pixel prediction values of the target pixel c and the adjacent pixel i.

The weight may further include a third value which is a divisor for a pixel prediction value, to which the first weight and the second weight are applied. The third weight may be a sum of the first weight and the second weight.

A prediction value of a pixel output from the combining module may be obtained using Equation $$\frac{1}{W_c}\left(w_c y_c + \sum_{i \in \Omega_c} w_i(y_i + z_c - z_i)\right).$$

where, wc denotes a weight of a target pixel c, Ωc denotes a set of adjacent pixels adjacent to the target pixel c, wi denotes a weight of an adjacent pixel i included in Ωc adjacent to the target pixel c, $W_c = w_c + \sum_{i \in \Omega_c} w_i$, yi denotes an independent prediction value of the adjacent pixel i, zc denotes a correlated pixel prediction value of the target pixel c, and zi denotes a correlated pixel prediction value of the adjacent pixel i.

A method of enhancing image quality according to another aspect of the present disclosure may include receiving at least one independent image and at least one correlated image, obtaining a weight to be used to combine the independent image and the correlated image using the independent image and the correlated image, and outputting a new image by combining the independent image and the correlated image according to the weight.

The weight includes a first weight for a pixel prediction value of a target pixel in the independent image, a second weight for a sum of an independent pixel prediction value of a certain adjacent pixel i adjacent to the target pixel c and a difference $z_c-z_i$ between correlated pixel prediction values of the target pixel c and the adjacent pixel i, and a third value which is a divisor for a pixel prediction value, to which the first weight and the second weight are applied.

The independent image, the correlated image, a feature of the independent image and a feature of the correlated image may be trained, in order to obtain the weight.

According to the present disclosure, it is possible to enhance the quality of an image.

According to the present disclosure, it is possible to further enhance the quality of an image during rendering, by faithfully reflecting the features of a specific image.

DETAILED DESCRIPTION OF THE INVENTION

Figure 1:
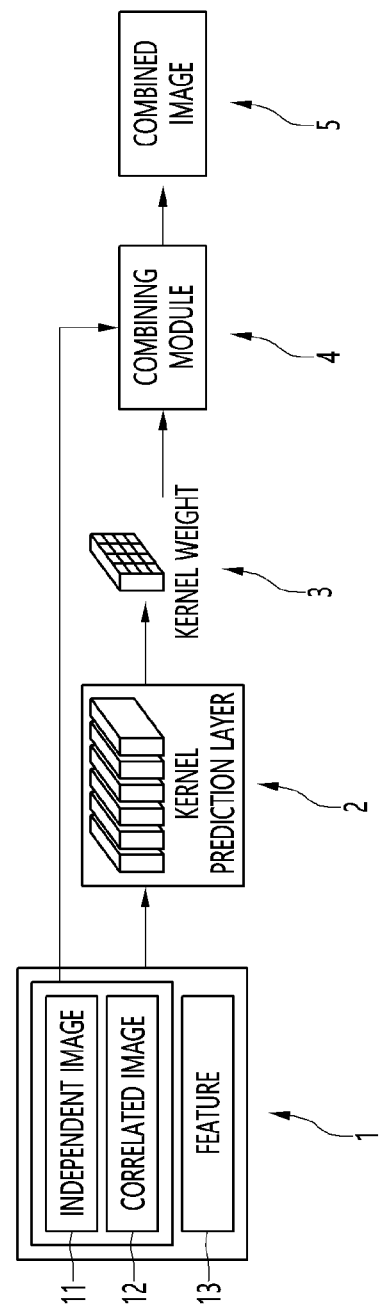
FIG. 1 is a view showing an apparatus for enhancing image quality according to an embodiment.

Hereinafter, specific embodiments of the present disclosure will be described in detail with reference to the drawings. The spirit of the present disclosure is not limited to the embodiments presented below, and those skilled in the art who understand the spirit of the present disclosure can easily propose other embodiments included within the scope of the same idea by addition, change or deletion of components.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

When it is said that a component is 'coupled with/to' or 'connected to' another component, it should be understood that the one component is connected to the other component directly or through any other component in between. On the other hand, when it is said that a component is 'directly connected to' or 'directly coupled to' another component, it should be understood that there is no other component between the components.

In this disclosure below, when one part is referred to as being 'connected' to another part, it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

Artificial intelligence may be performed by an artificial intelligence apparatus (see 2 of FIG. 1).

The present disclosure is characterized in that an independent image and a correlated image are used together to provide a certain image.

The present disclosure is characterized in that an independent image and a correlated image are combined to render a certain image.

FIG. 1 is a view showing an apparatus for enhancing image quality according to an embodiment.

Referring to FIG. 1, an input unit 1, through which an independent image 11 and a correlated image 12 are input, may be included. The independent image may be an image without correlation information between pixels of the image. The correlated image may be information with correlation information between pixels of the image. Each pixel of the image may include RGB information.

The correlated image and the independent image may be combined with each other by a combining module 4. The combining module may provide an image with enhanced quality, by combining the independent image and the correlated image. At least one independent image may be included. At least one correlated image may be included. Two or more independent images and two or more the correlated images may be included.

In the combining module 4, images may be combined in pixel units. The combining module 4 may use a weight when combining the images. The combining module 4 may use a weight when combining the pixels of the images.

The apparatus for enhancing image quality may include an artificial intelligence (AI) apparatus 2. The weight may be obtained for each pixel. The information of the input unit may be input to the AI apparatus 2. The AI apparatus 2 may obtain the weight by the artificial intelligence apparatus.

The weight 3 obtained by the AI apparatus 2 is applicable by the combining module 4. The combining module 4 may provide a combined image 5 by combining the independent image and the correlated image.

A feature 13 of each image may be input through the input unit 1. The feature may include normal information. The normal information may be vector information of a surface of an image. The feature may include texture information. The feature may include depth information. The feature may be calculated in advance while the independent image and the correlated image are generated. The feature may be used as additional information such as boundary identification of an object in an image.

Therefore, it is possible to obtain result images with enhanced quality.

Hereinafter, the configuration of the apparatus for enhancing image quality according to the embodiment will be described in detail. First, combining the independent image and the correlated image in the combining module will be described.

A model for performing prediction in a state in which a certain pixel has no relationship with another adjacent pixel may be given by Equation 1.

$$y_c = \mu_c + \epsilon_c \quad \text{Equation 1}$$

where, y denotes independent pixel prediction of each pixel, c denotes a target pixel, μ denotes ground truth, and ε denotes error.

Equation 1 above may be a model for providing an independent image. The method of Equation 1 may be used for modeling for providing path tracing.

A model for performing prediction in a state in which a certain pixel has a relationship with another adjacent pixel may be given by Equation 2.

$$z_c - z_i = \mu_c - \mu_i + \epsilon_{ci} \quad \text{Equation 2}$$

where, z denotes correlated pixel prediction of each pixel, c denotes a target pixel, i denotes an adjacent pixel adjacent to the target pixel, μ denotes ground truth, and a denotes error of the difference model of correlated pixel prediction. Accordingly, $z_c - z_i$ may mean a difference between correlated pixel prediction values of two pixels c and i.

The method of Equation 2 above is applicable to various methods of providing a correlated image.

The combining module 4 may combine the independent image and the correlated image using Equations 1 and 2 above.

By combining the independent image and the correlated image, information on the two images may be considered together. Here, at least one independent image may be included. Here, at least one correlated image may be included. At least one independent image and at least one correlated image may be included. Two or more independent images and two or more correlated images may be included. By providing more images, the effects of the apparatus for enhancing image quality may be further enhanced.

The independent image and the correlated image may be added with respective weights, thereby being combined. The independent image and the correlated image may be added and then divided by a normalization term, thereby being combined.

Equation 3 shows an example of a pixel prediction value for combining Equations 1 and 2 above.

$$\frac{1}{W_c}\left(w_c y_c + \sum_{i \in \Omega_c} w_i (y_i + z_c - z_i)\right) \quad \text{Equation 3}$$

where, wc denotes the weight of the target pixel c, Ωc denotes a set of adjacent pixels adjacent to the target pixel c, wi denotes the weight of an adjacent pixel i included in Ωc adjacent to the target pixel c, and $W_c = w_c + \Sigma_{i \in \Omega_c} w_i$. wc may be referred to as a first weight which is the weight of the target pixel c, wi may be referred to as a second weight which is the weight of a certain adjacent pixel i adjacent to the target pixel c, $W_c = w_c + \Sigma_{i \in \Omega_c} w_i$ may be referred to as a third value which is a sum of the weights of the target pixel and all adjacent pixels adjacent to the target pixel c.

The first weight may be a weight for a pixel prediction value of the target pixel in the independent image, in each target pixel.

The second weight may be a weight for a sum of an independent pixel prediction value yi of a certain adjacent pixel adjacent i to the target pixel c and a difference $z_c - z_i$ between correlated pixel prediction values of two pixels c and i.

The third weight may be applied as a divisor for pixel prediction values, to which the first weight and the second weight are applied.

The smaller errors εc, εi and εci, the more preferable. Accordingly, it is possible to obtain an image with best quality, by finding first, second and third weights which make the pixel prediction value given by Equation 3 smaller.

According to Equation 3, both independent pixel prediction (yc, yi) of the target pixel and the adjacent pixel and correlated pixel prediction (zc, zi) of the target pixel and the adjacent pixel may be used. The independent pixel prediction and the correlated pixel prediction may be values included in the independent image and the correlated image.

As described above, the weight may be obtained by the AI apparatus 2. The AI apparatus 2 may calculate a weight 3 for each pixel as a matrix.

Equation 3 above may be similarly derived through a least squares method. Of course, this may be derived through another method. Equation 4 is a result obtained by solving the least square problem.

$$\hat{\beta}_c = \frac{1}{W_c}\left(w_c y_c + \sum_{i \in \Omega_c} w_i y_i + \sum_{i \in \Omega_c} w_i(z_c - z_i)\right) \quad \text{Equation 4}$$

where, $\hat{\beta}$ may be an arbitrary value predicted to be ground truth D. A detailed process will be described. First, an error value may be defined in the form of $r=y-\beta$. The sum of the squares of the error values is defined as an objective function j. Equation 4 above may be derived by a method of enabling a value obtained by partially differentiating the value j by D to become zero.

The AI apparatus may obtain the weight by minimizing a loss function shown in Equation 5.

$$\hat{\theta}_i = \underset{\theta_i}{\operatorname{argmin}} \frac{1}{N} \sum_{i=1}^{N} \mathcal{L}(I_i, g(y_i, z_i, f_i; \theta_i)) \quad \text{Equation 5}$$

where, θ denotes a learning parameter in an artificial neural network, i denotes a pixel, N denotes the number of pixels, L denotes a loss function, I denotes the color of ground truth, g denotes a pixel value prediction equation given by Equations 3 and 4, y denotes an independent pixel prediction value of each pixel, z denotes a correlated pixel prediction value of each pixel, and f denotes the feature 13. The feature 13 may not be included. However, information such as the boundary of the image may be more accurately included, thereby enhancing the quality of the image.

In the detailed description of the loss function of Equation 5 above, the optimization factor of the denoising filter disclosed in Non-patent document 4 is applicable. It is assumed that the description of Document 4 is included in the present disclosure within a necessary range. Of course, another loss function is applicable. However, it may be correct to obtain the weight by applying a pixel value prediction equation for applying the independent image and the correlated image together. More accurate information may be obtained by further using color information and a feature in the loss function.

The weight 3 obtained by the AI apparatus 2 may be applied to the combining module 4, thereby providing the combined image 5.

The AI apparatus 2 may perform supervised learning. The AI apparatus 2 may have six convolutional layers. Each convolutional layer may have a 5*5 convolutional kernel. The AI apparatus 2 may provide a model that minimizes the loss function. The trained model may provide the weight matrix 3. For the detailed description of the AI apparatus, refer to the description of Non-patent document 5. The description of the non-patent document is included in the description of the present disclosure within a range necessary for understanding of the present disclosure. Another AI apparatus may be used.

Figure 2:
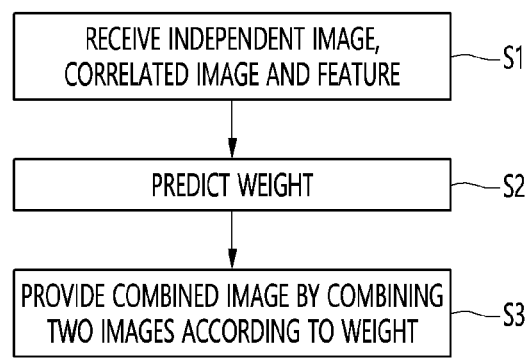
FIG. 2 is a view illustrating a method of enhancing image quality according to an embodiment.

FIG. 2 is a view illustrating a method of enhancing image quality according to an embodiment. For a description which is insufficient in the description of the embodiment, the apparatus for enhancing image quality shown in FIG. 1 is applicable.

In the method of enhancing image quality according to the embodiment, at least one independent image and at least one correlated image are received (S1). Thereafter, using the independent image and the correlated image, a weight to be used to combine the independent image and the correlated image is obtained (S2).

Here, the weight may be obtained by training a plurality of training images using the AI apparatus. To obtain the weight, a feature generated while providing the independent image and the correlated image may be further used.

According to the weight, the independent image and the correlated image may be combined (S3).

Figure 3:
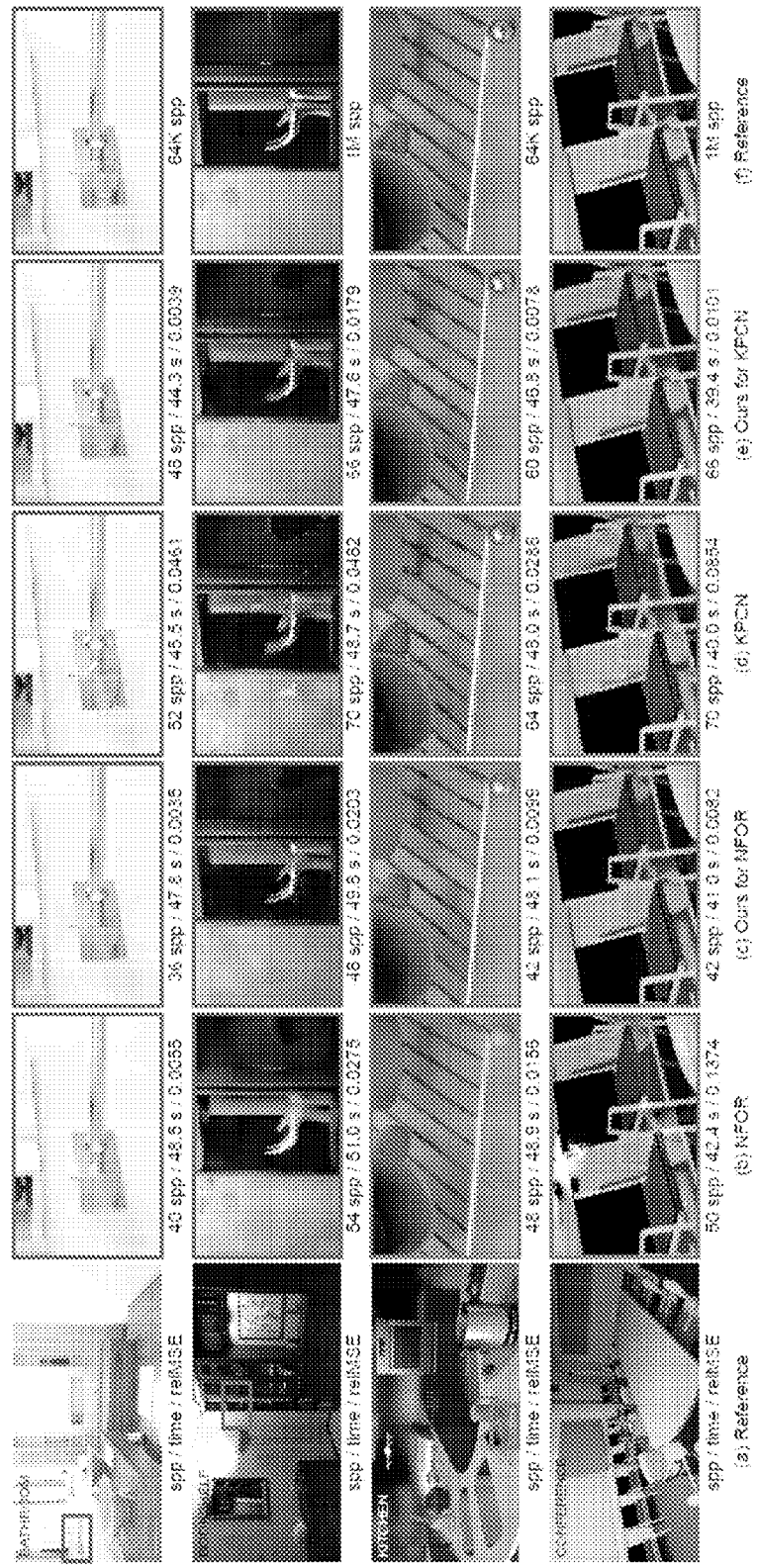
FIG. 3 is a view showing the effects of the present disclosure.

FIG. 3 is a view showing the effects of the present disclosure.

Referring to FIG. 3, a bathroom, a bookcase, a kitchen and a conference room are shown in respective rows. Full reference images, images, to which NFOR (Document 1: Nonlinearly weighted First-Order Regression) is applied, images, to which the embodiment of the present disclosure is applied for NFOR, images, to which KPCN (Document 5: Kernel-Predicting Convolutional Networks) is applied, images, to which the embodiment of the present disclosure is additionally applied for KPCN, and cropped reference images are shown in respective columns. By referring to the images, it can be seen that the quality of the image may be enhanced in the embodiment.

Meanwhile, in the apparatus for enhancing image quality of the present disclosure, the quality of the combined image may be further enhanced when the number of correlated images is larger than the number of independent images.

Specifically, a description will be given by referring to the variance of an arbitrary value $\hat{\beta}$ predicted to be ground truth given by Equation 6 below.

$$\operatorname{var}(\hat{\beta}_c) \approx \frac{1}{W_c^2}\left[w_c^2 \operatorname{var}(y_c) + \sum_{i \in \Omega_c} w_i^2 \operatorname{var}(y_i) + \left(\sum_{i \in \Omega_c} w_i\right)^2 \operatorname{var}(v_c) + \sum_{i,j \in \Omega_c} w_i w_j \operatorname{cov}(z_i, z_j) - 2\left(\sum_{i \in \Omega_c} w_i\right)\sum_{i \in \Omega_c} w_i \operatorname{cov}(z_c, z_i)\right] \quad \text{Equation 6}$$

In Equation 6 above, in order to confirm a value having high dependence on an outlier between the correlated pixel prediction value zc of the target pixel and the independent pixel prediction value yc of the target pixel, an equation excluding a term having direct influence is shown in Equation 7.

$$\frac{1}{(w_c + \Sigma_{i \in \Omega_c} w_i)^2}\left\{w_c^2 Var[y_c] + \left(\sum_{i \in \Omega_c} w_i\right)^2 Var[z_c]\right\} \quad \text{Equation 7}$$

In Equation 7 above, wc denotes the square of one weight and wi is the square of the sum of the weights of all adjacent pixels. Accordingly, the weight for the variance of correlated image may be larger. Accordingly, when there is an outlier in the correlated pixel prediction value of the target pixel, the present disclosure has the greater effect.

By using the independent image and the correlated image according to the present disclosure together, it is possible to provide an image with enhanced quality.

What in claimed is:

1. An apparatus for enhancing image quality, the apparatus comprising:
    one or more processors configured to:
    combine an independent image having pixels independent from each other and a correlated image including correlation information between pixels; and
    using an artificial intelligence (AI) based prediction model, provide a weight used to combine the independent image and the correlated image, wherein the independent image and the correlated image are combined in pixel units, and wherein the AI based prediction model is trained with the independent image and the correlated image together in order to provide the weight.

2. The apparatus of claim 1, wherein the weight is different for each pixel.

3. The apparatus of claim 1, wherein at least one independent image and at least one correlated image are included.

4. The apparatus of claim 1, wherein a feature of at least one of the independent image or the correlated image is further trained.

5. The apparatus of claim 4, wherein the feature includes at least one of normal information, texture information or depth information.

6. The apparatus of claim 5, wherein the feature includes all of normal information, texture information and depth information.

7. The apparatus of claim 1, wherein the weight includes:
a first weight for a pixel prediction value of a target pixel c in the independent image; and
a second weight for a sum of an independent pixel prediction value of a certain adjacent pixel i adjacent to the target pixel c and a difference $z_c - z_i$ between correlated pixel prediction values of the target pixel c and the adjacent pixel i.

8. The apparatus of claim 7, wherein the weight includes a third weight which is a divisor for a pixel prediction value, to which the first weight and the second weight are applied.

9. The apparatus of claim 8, wherein the third weight is a sum of the first weight and the second weight.

10. The apparatus of claim 1, wherein a prediction value of a pixel is obtained using Equation:

$$\frac{1}{W_c}\left(w_c y_c + \sum_{i \in \Omega_c} w_i (y_i + z_c - z_i)\right),$$

where, wc denotes a weight of a target pixel c, yc denotes an independent prediction value of the target pixel c, Ωc denotes a set of adjacent pixels adjacent to the target pixel, wi denotes a weight of an adjacent pixel i included in Ωc adjacent to the target pixel, $W_c = w_c + \Sigma_{i \in \Omega_c} w_i$, yi denotes an independent prediction value of the adjacent pixel, zc denotes a correlated pixel prediction value of the target pixel, and zi denotes a correlated pixel prediction value of the adjacent pixel.

11. A method of enhancing image quality, the method comprising:
receiving at least one independent image and at least one correlated image;
obtaining, using an artificial intelligence (AI) based prediction model, a weight to be used to combine the independent image and the correlated image using the independent image and the correlated image; and
outputting a new image by combining the independent image and the correlated image according to the weight,
wherein the independent image and the correlated image are combined in pixel units, and
wherein the AI based prediction model is trained with the independent image and the correlated image together in order to provide the weight.

12. The method of claim 11, wherein the weight includes a first weight for a pixel prediction value of a target pixel in the independent image.

13. The method of claim 12, wherein the weight includes a second weight for a sum of an independent pixel prediction value of a certain adjacent pixel i adjacent to the target pixel c and a difference $z_c - z_i$ between correlated pixel prediction values of the target pixel c and the adjacent pixels i.

14. The method of claim 13, wherein the weight includes a third value which is a divisor for a pixel prediction value, to which the first weight and the second weight are applied.

15. The method of claim 11, wherein the independent image, the correlated image, a feature of the independent image and a feature of the correlated image are trained, in order to obtain the weight.

16. An apparatus for enhancing image quality, the apparatus comprising:
a processor configured to:
receive an independent image having pixels independent from each other and a correlated image including correlation information between pixels;
provide a combined image by combining the independent image and the correlated image with each other; and
using an artificial intelligence (AI) based prediction model, provide a weight which is a control factor for including any one of information on the independent image or information on the correlated image in the combined image,
wherein the AI based prediction model is configured to provide the weight using both the independent image and the correlated image,
wherein the independent image and the correlated image are combined in pixel units, and
wherein the AI based prediction model is trained with the independent image and the correlated image together in order to provide the weight.

17. The apparatus of claim 16, wherein the weight is provided in units of pixels of the image.

18. The apparatus of claim 16,
wherein a feature of the independent image and a feature of the correlated image are further input, and
wherein the feature is further trained in the AI based prediction model.

* * * * *